United States Patent
Matsumoto et al.

(10) Patent No.: US 7,287,424 B2
(45) Date of Patent: Oct. 30, 2007

(54) THERMAL TYPE FLOW MEASUREMENT APPARATUS HAVING ASYMMETRICAL PASSAGE FOR FLOW RATE MEASUREMENT

(75) Inventors: Masahiro Matsumoto, Hitachi (JP); Masamichi Yamada, Hitachinaka (JP); Hiroshi Nakano, Hitachi (JP); Keiji Hanzawa, Mito (JP); Keiichi Nakada, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/210,869

(22) Filed: Aug. 25, 2005

(65) Prior Publication Data

US 2006/0162442 A1    Jul. 27, 2006

(30) Foreign Application Priority Data

Jan. 26, 2005    (JP)    ............................. 2005-018815

(51) Int. Cl.
*G01F 1/68* (2006.01)
(52) U.S. Cl. ................................. 73/204.15; 73/204.26
(58) Field of Classification Search .............. 73/204.26
See application file for complete search history.

(56) References Cited

U.S. PATENT DOCUMENTS 6,557,411 B1 *    5/2003    Yamada et al. ........... 73/204.26
6,745,625 B2 *    6/2004    Ariyoshi .................. 73/204.26

FOREIGN PATENT DOCUMENTS

| EP | 1 363 130 A2 | 11/2003 |
| EP | 1 452 838 A2 | 9/2004 |
| JP | 2003-065820 | 3/2003 |
| WO | WO89/05963 A1 | 6/1989 |

OTHER PUBLICATIONS

European Search Report dated Nov. 3, 2006 (Nine (9) pages).

* cited by examiner

*Primary Examiner*—Harshad Patel
(74) *Attorney, Agent, or Firm*—Crowell & Moring LLP (57) ABSTRACT

IN a thermal type flow measurement apparatus, a heating element is disposed in a fluid passage and generates heat by a passage of a current through itself. A first thermal sensitive element is disposed adjacent upstream of the heating element in a direction of fluid flow to be measured. A second thermal sensitive element is disposed adjacent downstream of the heating element in the direction of fluid flow to be measured. The fluid passage is provided with the heating element, the first thermal sensitive element, and the second thermal sensitive element. The fluid passage has an asymmetric structure with respect to the direction of fluid flow.

Means for measuring a difference of temperatures is sensed by the first and the second thermal sensitive elements to produce a voltage according to a fluid flow rate. Heat control means for controlling the passage of the current through the heating element so that a sum with weights of respective temperatures sensed by the first and the second thermal sensitive elements reaches a preset value.

12 Claims, 8 Drawing Sheets

THERMAL TYPE FLOW MEASUREMENT APPARATUS HAVING ASYMMETRICAL PASSAGE FOR FLOW RATE MEASUREMENT

CLAIM OF PRIORITY

The present application claims priority from Japanese application serial no. 2005-18815, filed on Jan. 26, 2005, the content of which is hereby incorporated by reference into this application.

BACKGROUND OF THE INVENTION

The present invention relates to a thermal type flow measurement apparatus, more particularly, to a thermal type flow measurement apparatus having an asymmetrical passage for measuring a fluid flow rate, and measuring the flow rate by a way of sensing a temperature difference of an upstream side thermal sensitive element and a downstream side thermal sensitive element of the heating element.

The following thermal type flow measurement apparatus is known. That is, it has a heating element and thermal sensitive resistors disposed, in a direction of fluid flow, on both the upstream and the downstream sides of the heating element. A fluid flow rate is measured based of the difference between a temperature sensed by the upstream side thermal sensitive resistor and a temperature sensed by the downstream side thermal sensitive resistor.

In the thermal type flow measurement apparatus using such a temperature difference sensing method, when the fluid flow rate to be measured becomes large, the temperature of the upstream side thermal sensitive resistor does not decrease below a certain value, and the temperature of the downstream thermal sensitive resistor tends to decrease.

In such a case, as the fluid flow rate increases, the difference between the temperatures sensed by the upstream side thermal sensitive resistor and the downstream side thermal sensitive resistor, ideally, ought to become larger. Since, however, such a relation ship is not obtained, the flow measurement sensitivity decreases in a large flow rate range.

Therefore, in a technical matter described in Japanese Patent Laid-Open No. 2003-65820 (Patent Document 1), an electric power supplied to a heating resistor is controlled so that the average of the temperatures sensed by the thermal sensitive resistors on the upstream and the downstream sides, respectively, is kept constant.

In such a prior art, when, in a large flow rate range, the temperatures sensed by the thermal sensitive resistors on the upstream and the downstream sides both start decreasing, the electric power supplied to the heating element is controlled so as to increase the temperatures, thereby making it possible to obtain a temperature difference corresponding to the flow rate.

In measuring an intake air rate for an automobile engine, there are cases in which not only a forward flow (a fluid flow in a direction to cause a thermal type flow measurement apparatus to output a positive value, i.e., a flow of air toward the engine), but also a reverse flow (fluid flow in a direction to cause the thermal type flow measurement apparatus to output a negative value, i.e., a flow due to spitting from the engine) occurs.

In a case where the thermal measurement apparatus is a household gas flow meter, no reverse flow occurs, so that no problem associated with the flow direction is caused. But, in a case where an amount of air taken into an automobile engine is to be measured, a reverse flow of a non-negligible magnitude is caused by spitting from the engine.

The flow measurement apparatus is therefore required to have adequate sensitivity not only for a forward flow but also for a reverse flow.

In a case where an amount of air taken into, for example, an automobile engine is to be measured, dust if adhering to a flow measurement element causes the sensing accuracy to decrease. There is a technique devised to prevent dust having entered a sub-passage (:secondary passage; bypass passage) from reaching the flow measurement element. It uses a subpassage which is, for example, scroll-shaped making a fluid passage asymmetric with respect to the flow direction.

When such a fluid passage asymmetric with respect to the flow direction is used, a forward fluid flow and a reverse fluid flow show largely different, asymmetric characteristics.

Conventional arts do not at all take into account improvement in reverse flow sensing sensitivity realized by using a fluid passage asymmetric with respect to the flow direction.

Even if the technique matter described in the Patent Document 1 is applied to a case where a fluid passage asymmetric with respect to the flow direction is used, flow sensing errors result with no measures taken in terms of reverse flow sensing.

SUMMARY OF THE INVENTION

An object of the present invention is to provide a thermal type flow measurement apparatus including thermal sensitive elements installed in an asymmetric passage and using a temperature difference sensing method; and which can suppress, by making characteristics of the thermal sensitive elements approximately the same for a forward flow and for a reverse flow, flow sensing errors even in the presence of fluid pulsation.

A thermal type flow measurement apparatus according to the present invention comprises: a heating element disposed in a fluid passage and which generates heat by a passage of a current through itself; a first thermal sensitive element disposed adjacent upstream of the heating element in a direction of fluid flow to be measured; a second thermal sensitive element disposed adjacent downstream of the heating element in the direction of fluid flow to be measured, and a passage which has an asymmetric structure with respect to the direction of fluid flow. In the fluid passage, the heating element, the first thermal sensitive element, and the second thermal sensitive element are disposed. A difference of temperatures sensed by the first and the second thermal sensitive elements to produce a voltage according to a fluid flow rate.

A heat control means controls the passage of the current through the heating element so that a sum with weights of respective temperatures sensed by the first and the second thermal sensitive elements reaches a preset value. By doing so, characteristics of the thermal sensitive elements are made approximately the same for a forward flow and for a reverse flow, and flow detection errors are suppressed even in the presence of fluid pulsation.

In the thermal type flow measurement apparatus including thermal sensitive elements installed in the asymmetric passage and using a temperature difference detection method, the apparatus can make characteristics of the thermal sensitive elements approximately the same for a forward flow and for a reverse flow. Thereby it can suppress flow sensing errors even in the presence of fluid pulsation.

DETAILED DESCRIPTION OF THE PREFERRED EMBODIMENTS

In the following, embodiments of the present invention will be described with reference to drawings.

First, a thermal type flow measurement apparatus according to an embodiment of the present invention will be described with reference to FIGS. 1 to 9.

Figure 1:
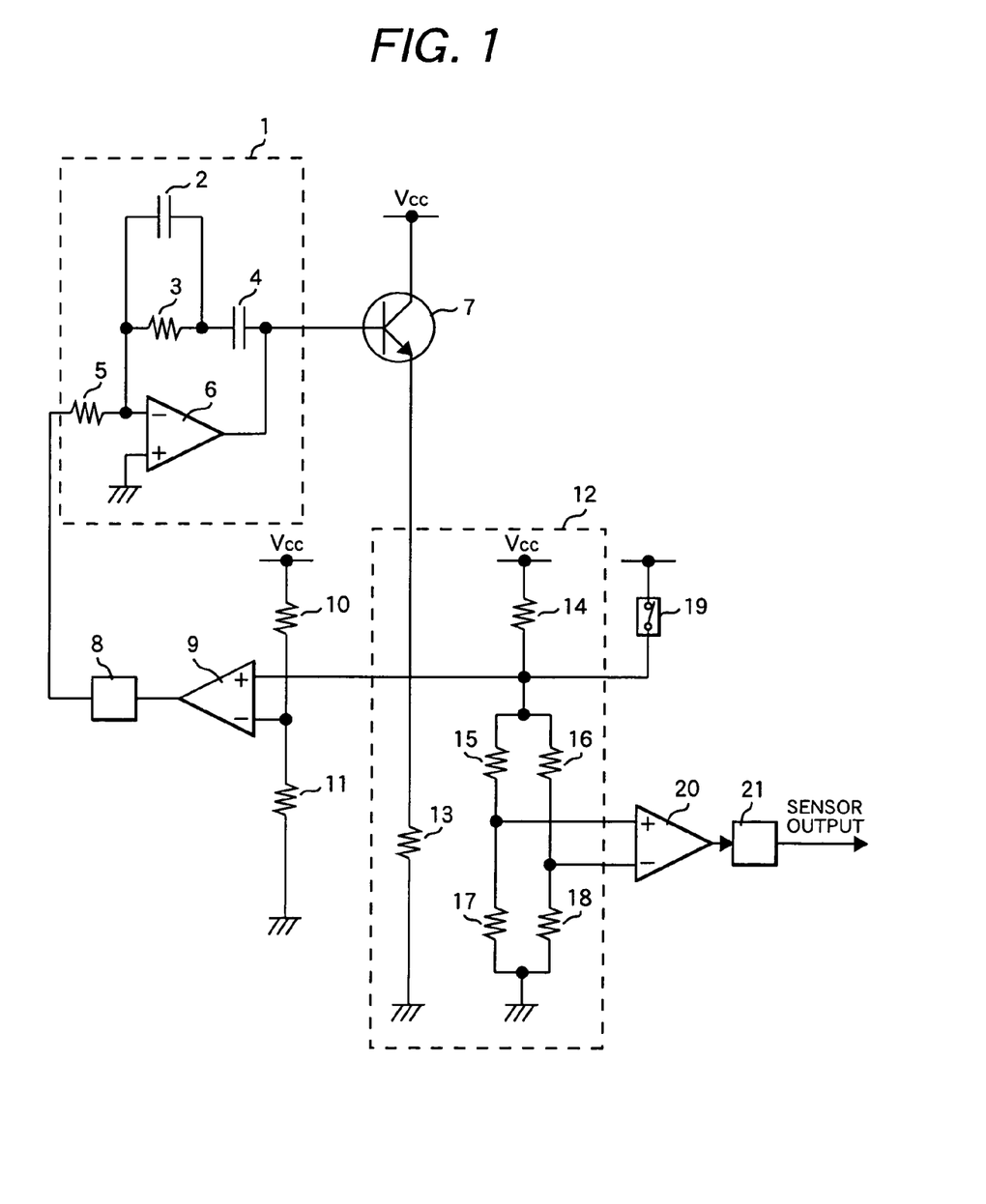
FIG. 1 is a block diagram of a drive circuit of a thermal type flow measurement apparatus according to a first embodiment of the present invention.
Figure 2:
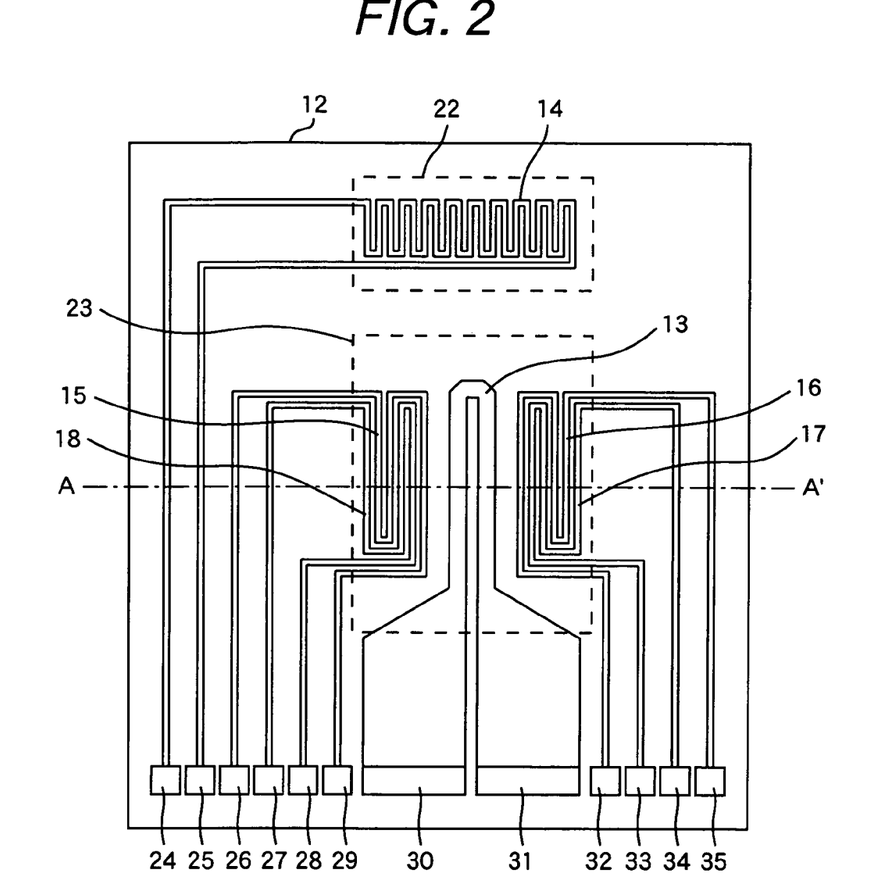
FIG. 2 is a plan view of a sensor element according to the first embodiment of the present invention.
Figure 3:
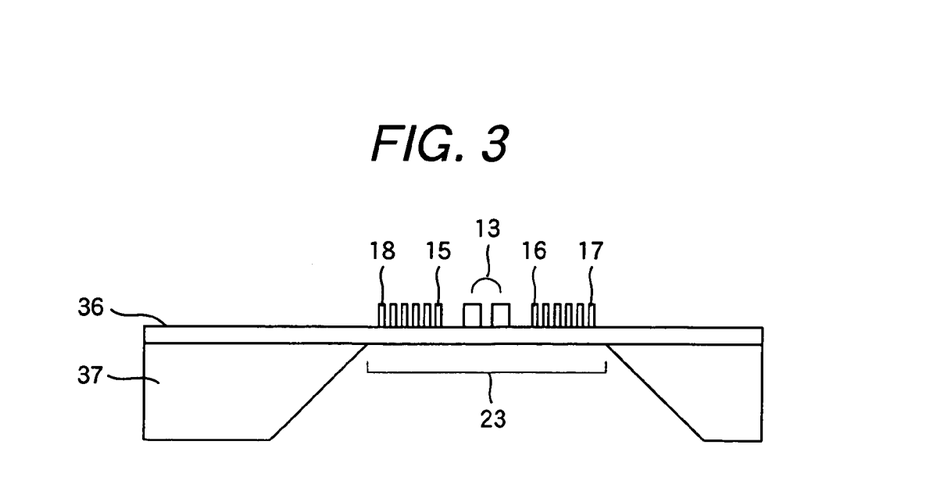
FIG. 3 is a sectional view taken along line A-A' of FIG. 2.
Figure 4:
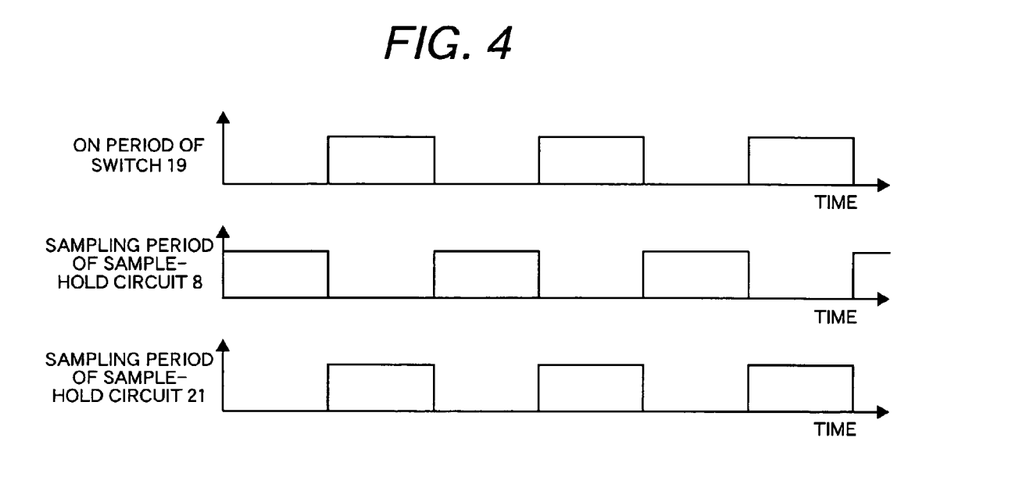
FIG. 4 is an operation timing diagram of the drive circuit included in the thermal type flow measurement apparatus according to the first embodiment.

FIG. 1 is a block diagram of a drive circuit of a thermal type flow measurement apparatus according to a first embodiment of the present invention. FIG. 2 is a plan view of a sensor element (thermal type flow measurement element) 12 included in the thermal type flow measurement apparatus according to the first embodiment. FIG. 3 is a sectional view taken along line A-A' of FIG. 2. FIG. 4 is an operation timing diagram of the drive circuit shown in FIG. 1.

Figure 5:
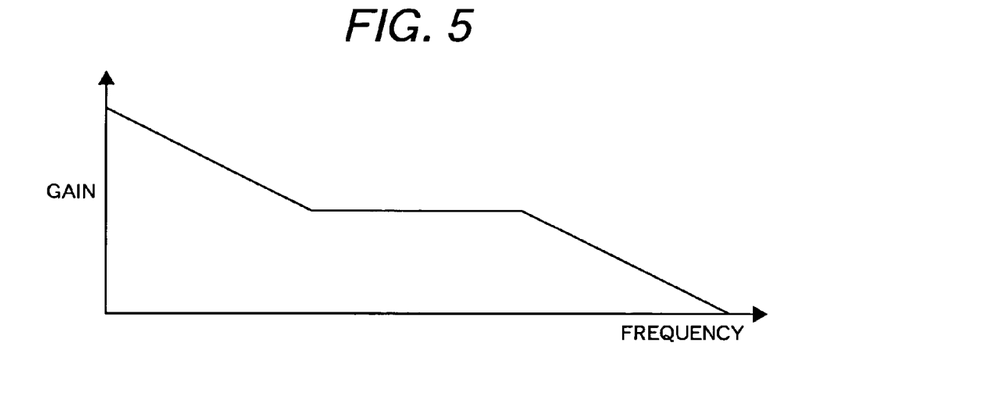
FIG. 5 is a diagram showing a frequency response of a transfer function of a phase compensation circuit according to the first embodiment.
Figure 6:
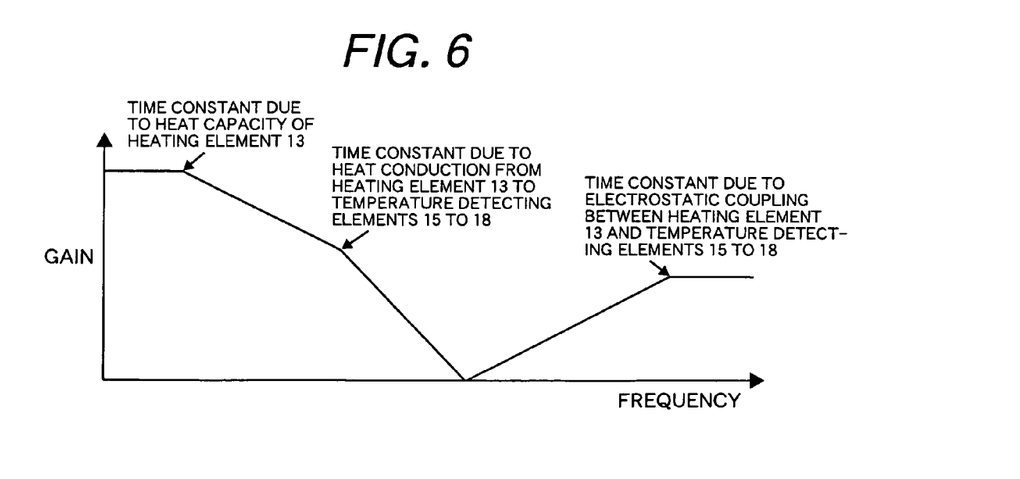
FIG. 6 is a diagram showing a frequency response of a transfer function from a drive voltage applied to a heating resistor to a resistance of a bridge circuit composed of thermal sensitive resistors according to the first embodiment.
Figure 7:
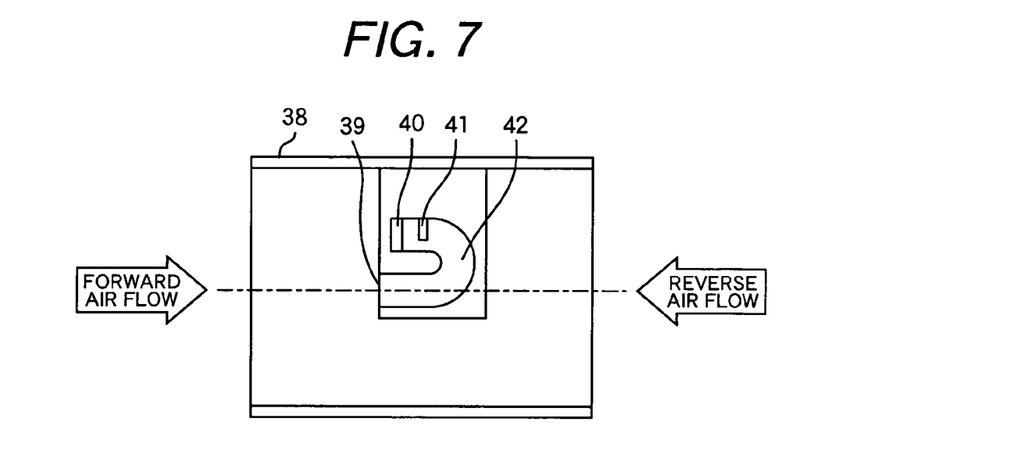
FIG. 7 is a diagram illustrating an example of installation in an intake pipe of the thermal type flow measurement apparatus of the first embodiment.
Figure 8:
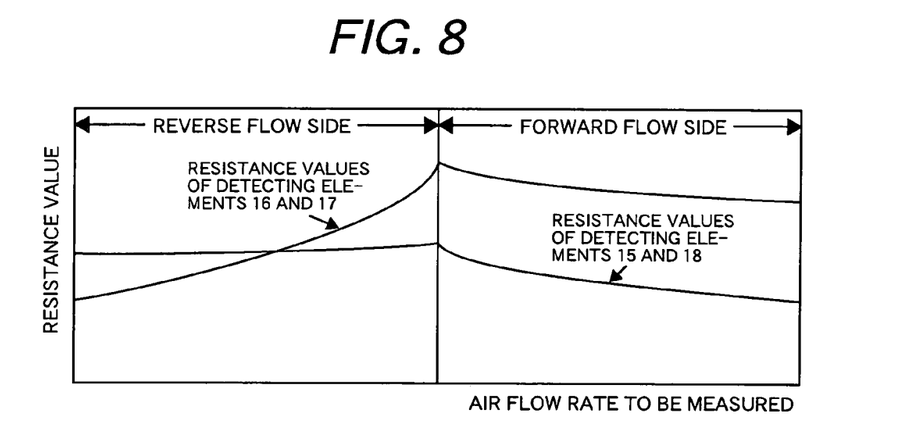
FIG. 8 is a diagram showing variations in resistance of thermal sensitive resistors with respect to an air flow to be measured with the temperature of the heating resistor kept constant in the first embodiment.
Figure 9:
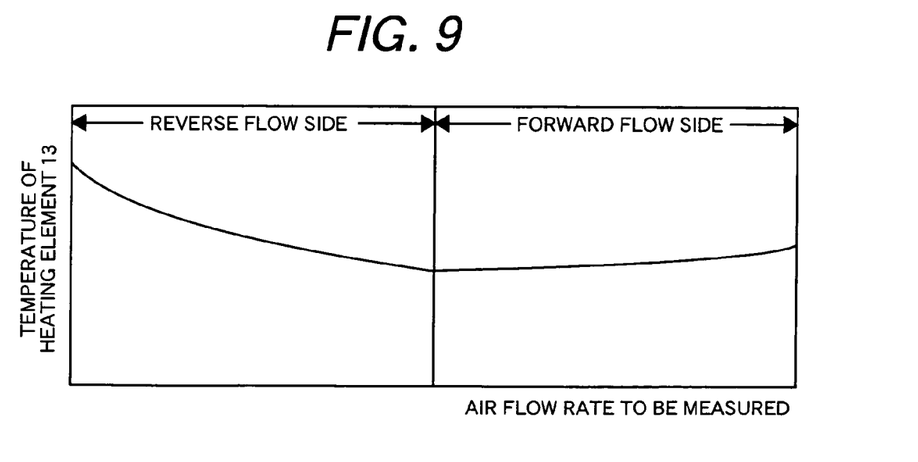
FIG. 9 is a diagram showing a relationship between the volume of air to be measured and the temperature of the heating resistor in the first embodiment.

FIG. 5 is a diagram showing a frequency response of a transfer function of a phase compensation circuit 1 shown in FIG. 1. FIG. 6 is a diagram showing a frequency response of a transfer function to the resistances of thermal sensitive resistors 15 to 18 forming a bridge circuit. The bridge circuit is applied with a drive voltage equal to that applied to a heating resistor 13. FIG. 7 is a diagram for describing the thermal type flow measurement apparatus of the first embodiment installed in an intake pipe 38. FIG. 8 is a diagram showing variations in resistances of the thermal sensitive resistors 15 to 18 with respect to an air flow to be measured in case where the heating resistor 13 is kept at a constant temperature. FIG. 9 is a diagram showing a temperature characteristic of the heating resistor 13.

A configuration of the sensor element (thermal flow measurement element) 12 of the thermal type flow measurement apparatus according to the present invention is described in the following with reference to FIGS. 2 and 3.

The sensor element 12 has an insulating film 36 formed on the surface of a substrate 37. The substrate is made of highly heat conductive material such as silicon and ceramic. The substrate 37 is etched on its backside so as to form cavities under the insulating film 36, thereby, forming thin-walled sections as diaphragms 22 and 23 on the substrate 37.

On the surface of the diaphragms 22, a temperature sensing resistor 14 is formed so as to sense the temperature of airflow to be measured. A heating resistor 13 as the heating resistor and thermal sensitive resistors 15, 16, 17, and 18 as thermal sensitive elements are formed on the surface of the diaphragm 23. The thermal sensitive resistors 15-17 are disposed on the upstream and the downstream sides of the heating resistor 13 in a direction of airflow. The heating resistor 13 is heated to keep a predetermined temperature difference with respect to a temperature of air to be measured. Thermal sensitive resistors 15, 16, 17, and 18 are used for temperature sensors for an adjacent upstream area and an adjacent downstream area of the heating resistor 13.

The heating resistor 13 is made of such material as polysilicon thin film, platinum thin film, or nickel alloy thin film etc. It generates heat when a current is passed through it.

The temperature sensing resistor 14 and the thermal sensitive resistors 15 to 18 are also made of such material as polysilicon thin film, platinum thin film, or nickel alloy thin film etc.. Making use of their characteristics that their resistances vary according to temperature, they sense temperatures of locations where they are disposed.

A distance between the thermal sensitive resistors 15, 18 (a first thermal sensitive resistors as a first thermal element) on the one side and the heating resistor is larger than that between the thermal sensitive resistors 16, 17 (a second thermal sensitive resistors as a second thermal element) on another side and the heating resistor. Thereby, the thermal sensitive resistors 15 and 18 are less heat-sensitive for heat from the heating resistor 13 than the thermal sensitive resistors 16 and 17.

In this arrangement, when the air flow rate is 0, temperature-rise of the thermal sensitive resistors 15 and 18 due to heat generation of the heating resistor 13 is less than that of the thermal sensitive resistors 16 and 17.

The heating resistor 13, the temperature sensing resistor 14 and the thermal sensitive resistors 15 to 18 are connected to pads 24 to 35, so that their wiring can be led out for external connections.

Next, a configuration of a drive circuit of the thermal type flow measurement apparatus according to the present embodiment will be described with reference to FIG. 1.

The drive circuit includes the following parts; the heating resistor 13 and the thermal sensitive resistors 15 to 18 disposed on the sensor element 12; a drive transistor 7 for driving the heating resistor 13; an amplifier 20 for generating a sensor output by amplifying the output voltage of the bridge circuit composed of the thermal sensitive resistors 15 to 18; and a sample and hold circuit 21 for sampling and holding the output from the amplifier 20.

The drive circuit also includes the following parts: an amplifier 9 for amplifying a difference between a voltage at a connection point between the bridge circuit composed of the thermal sensitive resistors 15 to 18 and the temperature sensing resistor 14, and a voltage at a connection point between resistors 10 and 11; a sample and hold circuit 8 for sampling and holding the output from the amplifier 9; the phase compensation circuit 1 composed of resistors 3, 5, capacitors 2, 4 and an amplifier 6 and which amplifies the output from the sample and hold circuit 8, and a switch 19 for shorting across the temperature sensing resistor 14.

Next, the operation of the drive circuit will be described with reference to FIGS. 4 to 6.

The drive circuit operates repeating the following two operation modes.

A first operation mode is for controlling a heating value of the heating resistor 13. In the first operation mode, the switch 19 is off, the sample and hold circuit 8 is in a state of sampling, and the sample and hold circuit 21 is in a state of holding.

During the first operation mode, a positive input of the amplifier 9 is applied with a divided voltage which is obtained by dividing a supply voltage Vcc using the temperature sensing resistor 14 and the bridge circuit composed of the thermal sensitive resistors 15 to 18. Here, a resistance of the temperature sensing resistor varies with temperature of air to be measured.

The difference between the voltage applied to the positive input of the amplifier 9 and the voltage obtained by dividing the supply voltage Vcc using resistors 10 and 11 is amplified by the amplifier 9. The difference voltage thus amplified is applied to the base of the drive transistor 7, via the sample and hold circuit 8 and the phase compensation circuit 1 that performs integration operation as shown in FIG. 5. Thereby, the conduction ratio of the transistor 7 is controlled to control the current to be passed through the heating resistor 13.

The drive circuit therefore operates toward equalizing the voltage obtained by dividing the supply voltage Vcc using the temperature sensing resistor 14 and the bridge circuit (thermal sensitive resistors 15 to 18) and the voltage obtained by dividing the supply voltage Vcc using resistors 10 and 11.

For the above purpose, the drive circuit operates so as to keep the resistance ratio between the temperature sensing resistor 14 and the bridge circuit (thermal sensitive resistors 15 to 18) constant, that is, so as to keep constant the difference between the temperature of the air flow to be measured (which is indicated by the temperature sensing resistor 14) and the temperature of the heating resistor 13 (which is indicated by the thermal sensitive resistors 15 to 18).

The combined resistance of the bridge circuit (thermal sensitive resistors 15 to 18) is a function of the temperatures and resistances of the thermal sensitive resistors 15 to 18 (for first approximation, a weighted addition or weighted average of the temperatures of the thermal sensitive resistors 15 to 18 weighted with values dependent on the resistances of the thermal sensitive resistors 15 to 18).

The difference between the temperature of the air flow to be measured (which is indicated by the temperature sensing resistor 14,) and the temperature of the heating resistor 13 (which is indicated by the thermal sensitive resistors 15 to 18) becomes equal to a value preset with the resistors 10 and 11.

It is possible, by providing the resistors 10 and 11 with an optional temperature characteristic, to provide the temperature difference indicated by the temperature sensing resistor 14 of the air flow to be measured, and the temperature indicated by the thermal sensitive resistors 15 to 18 due to the heating resistor 13 with an optional temperature characteristic.

The frequency response of the transfer function from the drive voltage for the heating resistor 13 to the resistance of the bridge circuit composed of the thermal sensitive resistors 15 to 18 is as shown in FIG. 6. As shown in FIG. 6, the transfer function has three frequency poles corresponding, respectively, to a time constant due to a heat capacity of the heating resistor 13, a time constant due to conduction of heat from the heating resistor 13 to the thermal sensitive resistors 15 to 18, and a time constant due to electrostatic coupling between the heating resistor 13 and the thermal sensitive resistors 15 to 18.

Therefore, in the drive circuit shown in FIG. 1, the phase compensation circuit 1 is given a frequency response so that the gain is constant in a vicinity of the frequency pole corresponding to the time constant due to the heat conduction from the heating resistor 13 to the thermal sensitive resistors 15 to 18. This is to stabilize a control system for the heating resistor 13.

Next, a second operation mode will be described. In the second operation mode, a signal of the air flow rate to be measured is obtained by sensing a bridge voltage of the bridge circuit (thermal sensitive resistors 15 to 18).

In the second operation mode, the switch 19 is on, the sample and hold circuit 8 is in a holding state, and the sample and hold circuit 21 is in a sampling state. During the second operation mode, the supply voltage Vcc is applied to the bridge circuit composed of the thermal sensitive resistors 15 to 18, so that a voltage drop due to the temperature sensing resistor 14 does not occur.

In this arrangement, a large output can be obtained from the bridge circuit (thermal sensitive resistors 15 to 18).

In the bridge circuit (thermal sensitive resistors 15 to 18), the upstream side thermal sensitive resistors 15, 17 and the downstream side thermal sensitive resistors 16, 18, with respect to the forward flow, are placed in a cross arrangement. And the upstream side thermal sensitive resistor 15 and the downstream side thermal sensitive resistor 16 are placed in the upper arm of the bridge circuit. The upstream side thermal sensitive resistor 18 and the downstream side thermal sensitive resistor 17 are placed in the lower arm thereof. Thus, the bridge circuit outputs a voltage corresponding to the temperature difference between the upstream side resistors and the downstream side resistors of the heating resistor 13.

The output of the bridge circuit (thermal sensitive resistors 15 to 18) is amplified by the amplifier 20 and then sampled by the sample and hold circuit 21 to be output as a sensor output.

Next, features of the thermal type flow measurement apparatus according to the first embodiment of will be described with reference to FIGS. 7 to 9.

As shown in FIG. 7, the intake pipe 38 is provided with a secondary passage as a bypass passage 42 for measuring airflow rate, and a thermal type flow measurement apparatus 41 is installed in the bypass passage 42.

The bypass passage 42 is asymmetrically shaped with respect to the direction of airflow. A forward flow inlet 39 squarely faces the forward airflow. A reverse flow inlet 40 does not squarely face the reverse airflow. This asymmetrical arrangement is to cope with backfiring of an engine or problems caused by dust. With this arrangement, air flowing in the forward direction can easily enter the bypass passage 42, compared with air flowing in the reverse direction. Therefore, more air flowing in the forward direction than air flowing in the reverse direction passes through the thermal type flow measurement apparatus 41, resulting in higher measurement sensitivity for the air flowing in the forward direction than for the air flowing in the reverse direction.

When measuring the intake air flow rate of an engine, it is preferable to measure the air flow rate at as close a location as possible to the engine. At a location closer to the engine, however, a reverse airflow is larger due to spitting from the engine.

When measuring the air flow rate alternating between the forward direction and the reverse direction, therefore, the flow measurement apparatus to be used is desired to have equal characteristics for the forward airflow and for the reverse airflow.

For example, assume a case where an air flow whose direction sinusoidally changes between a positive side and a negative side (alternating between the forward direction and the reverse direction) is led into a flow measurement apparatus. If a forward flow signal is larger than a reverse flow signal relatively, the air flow rate calculated based on the collected signals as they are contains a large error on the positive side.

To cope with the problem, the thermal type flow measurement apparatus 41 according to the present invention includes the sensor element 12 and the drive circuit arranged to make the measurement sensitivity higher for the reverse flow than for the forward flow.

The sensor element 12 of the thermal type flow measurement apparatus 41 is configured so that a distance between the thermal sensitive resistors 15, 18 and the heating resistor is larger than that between the thermal sensitive resistors 16, 17 and the heating resistor. Thereby, in a state where no airflow is present, the thermal sensitive resistors 15 and 18 are less heat-sensitive for heat from the heating resistor 13 than the thermal sensitive resistors 16 and 17.

Thus, in a state where the temperature of the heating resistor 13 is kept constant, the resistances of the thermal sensitive resistors 15 to 18 vary with respect to the air flow rate to be measured as shown in FIG. 8.

In a case where the configuration according to the present invention is not adopted, when air flows in the forward direction, the resistances of the upstream thermal sensitive resistors 15 and 18 on the upstream side largely vary whereas the resistances of the downstream thermal sensitive resistors 16 and 17 do not vary much. In a case where the configuration according to the present invention is adopted, such a difference between resistance variations of the upstream thermal sensitive resistors 15, 18 and resistance variations of the down stream thermal sensitive resistors 16, 17 is smaller. This is because the thermal sensitive resistors 15 and 18 are disposed further away from the heating resistor 13 as compared with the thermal sensitive resistors 16 and 17.

When a reverse flow occurs, the resistances of the upstream side thermal sensitive resistors 16 and 17 largely vary whereas the resistances of the downstream side sensitive resistors 15 and 18 do not vary much. In this case, the resistance variations of the thermal sensitive resistors 16 and 17 being disposed closer to the heating resistor 13 are further enlarged.

In the present embodiment, when the drive circuit shown in FIG. 1 operates with the thermal sensitive resistors 15 to 18 arranged so that their resistances vary as described above, the following effects are obtained. The temperature variation rate of the heating resistor 13 with respect to the air flow rate becomes higher, as shown in FIG. 9, when air flows in the reverse direction than when air flows in the forward direction. The measurement sensitivity can, therefore, be made higher for air flowing in the reverse direction than for air flowing in the forward direction.

The present invention, compared with conventional techniques, also provides an effect of reducing power consumption. Such an effect will be described in the following.

As can be seen from the relationship between air flow rate and temperature of the heating resistor 113, in the present embodiment, the rise of temperature of the heating resistor 13 in the presence of a forward flow is smaller than in conventional cases. This is because the thermal effect from the heating resistor 13 to the thermal sensitive resistors 15 and 18 is small. Therefore, when the air flow rate is large, the rise of temperature of the heating resistor 13 can be held small. A smaller rise of temperature of the heating resistor 13 results in smaller power consumption. The rise of temperature of the heating resistor 13 in the presence of a reverse flow is larger in the present embodiment than in conventional cases. With the passage being structured as it is, however, the air flow rate in the reverse direction is small, so that the power consumption by the heating resistor remains small.

Figure 10:
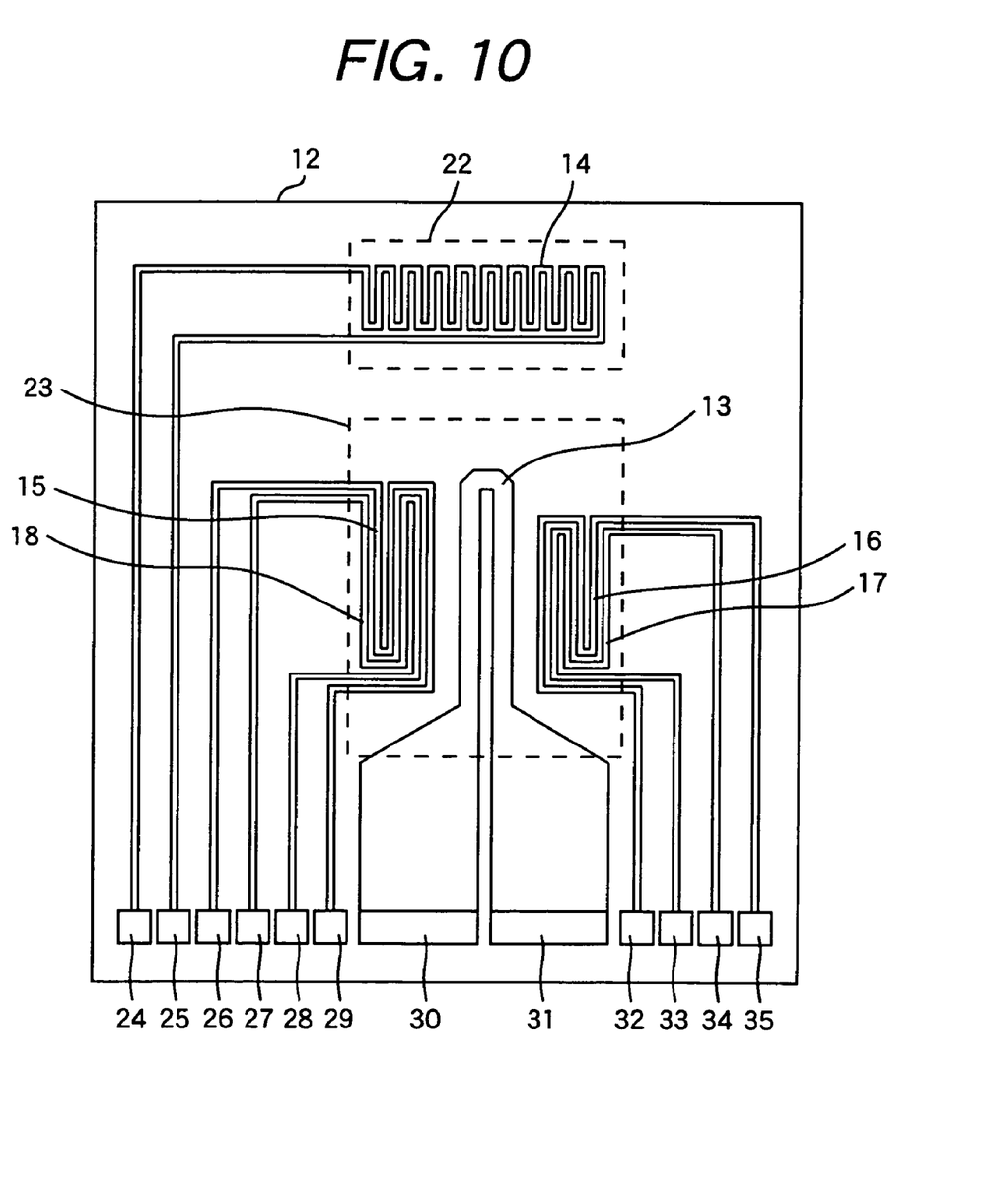
FIG. 10 is a plan view of a sensor element included in a thermal type flow measurement apparatus according to a second embodiment of the present invention.

Next, a thermal type flow measurement apparatus according to a second embodiment of the present invention will be described with reference to FIG. 10. FIG. 10 is a plan view of a sensor element 12 included in the thermal type flow measurement apparatus according to the second embodiment.

Except for the shapes of the thermal sensitive resistors 16 and 17, the sensor element according to the second embodiment has the same configuration as the sensor element 12 included in the thermal type flow measurement apparatus according to the first embodiment. Therefore, reference numerals which are shown in FIG. 10 and which are the same as those shown in FIG. 1 denote parts equivalent to those shown in FIG. 1.

In the sensor element 12 of the second embodiment, the thermal sensitive resistors 16 and 17 are disposed so as to face a central portion of the heating resistor 13.

The temperature of the heating resistor 13 becomes higher toward its central portion, and becomes lower toward its edges. Therefore, disposing the thermal sensitive resistors 16 and 17, compared with the thermal sensitive resistors 15 and 18, to mostly face the central portion of the heating resistor 13. Thereby, the thermal sensitive resistors 16 and 17 to be more affected than the thermal sensitive resistors 15 and 18 by the heat generated by the heating resistor 13. In this way, effects similar to those obtained in the first embodiment can be obtained.

The thermal sensitive resistors 16 and 17 have smaller length than the thermal sensitive resistors 15 and 18, so that the thermal sensitive resistors 16 and 17 have smaller resistances than the thermal sensitive resistors 15 and 18.

With the thermal sensitive resistors 16 and 17 having smaller resistances than the thermal sensitive resistors 15 and 18, variations in the resistances of the thermal sensitive resistors 16 and 17 can affect the positive input voltage of the amplifier 9 more than that of the thermal sensitive resistors 15 and 18. This also allows effects similar to those obtained in the first embodiment to be obtained.

The resistances of the thermal sensitive resistors 16 and 17 may also be reduced by changing their width or resistivity.

Figure 11:
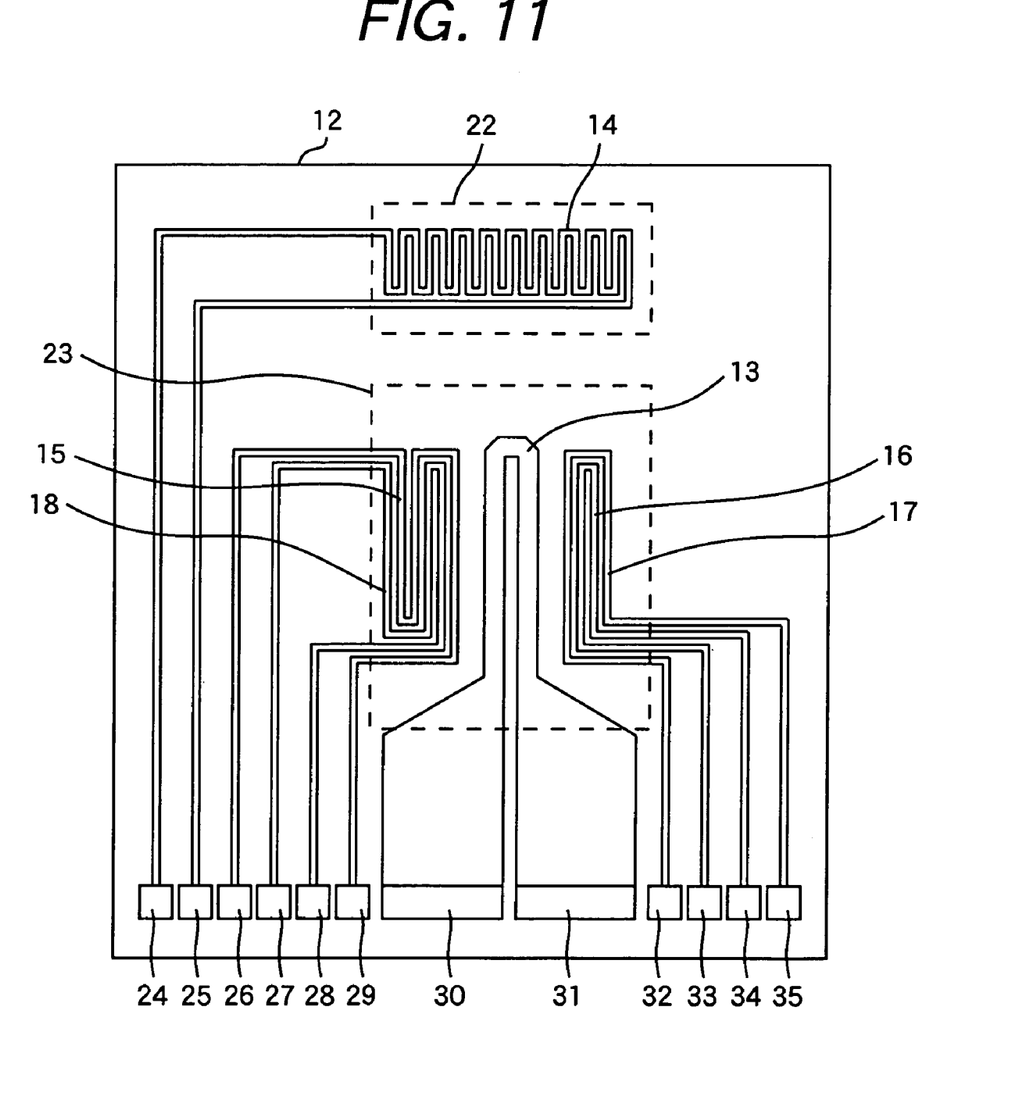
FIG. 11 is a plan view of a sensor element included in a thermal type flow measurement apparatus according to a third embodiment of the present invention.

Next, a thermal type flow measurement apparatus according to a third embodiment of the present invention will be described with reference to FIG. 11. FIG. 11 is a plan view of a sensor element 12 included in the thermal type flow measurement apparatus according to the third embodiment of the present invention.

Except for the shapes of the thermal sensitive resistors 16 and 17, the sensor element according to the third embodiment has the same configuration as the sensor element 12 included in the thermal type flow measurement apparatus according to the first embodiment. Therefore, reference numerals which are shown in FIG. 11 and which are the same as those shown in FIG. 1 denote parts equivalent to those shown in FIG. 1.

In the sensor element 12 of the third embodiment, a total width of the thermal sensitive resistors 16 and 17 in the fluid flow direction is smaller than that of the embodiment shown in FIG. 2. The thermal sensitive resistors 16 and 17 are disposed in an area closer to (in the direction of the fluid flow) the heating resistor 13 than that of the thermal sensitive resistors 15 and 18.

In this arrangement, the thermal sensitive resistors 16 and 17 are affected more than the thermal sensitive resistors 15 and 18 by the heat generated with the heating resistor 13. In this way, effects similar to those obtained in the first embodiment can be obtained.

With the total width of the thermal sensitive resistors 16 and 17 in the fluid flow direction being smaller than in the example shown in FIG. 2, the thermal sensitive resistors 16 and 17 have smaller length than the thermal sensitive resistors 15 and 18. Hence, the thermal sensitive resistors 16 and 17 have smaller resistances than the thermal sensitive resistors 15 and 18.

With the thermal sensitive resistors 16 and 17 having smaller resistances than the thermal sensitive resistors 15 and 18, variations in the resistances of the thermal sensitive resistors 16 and 17 can affect the positive input voltage of the amplifier 9 more than can variations in the resistances of the thermal sensitive resistors 15 and 18. This also allows effects similar to those obtained in the first embodiment to be obtained.

Figure 12:
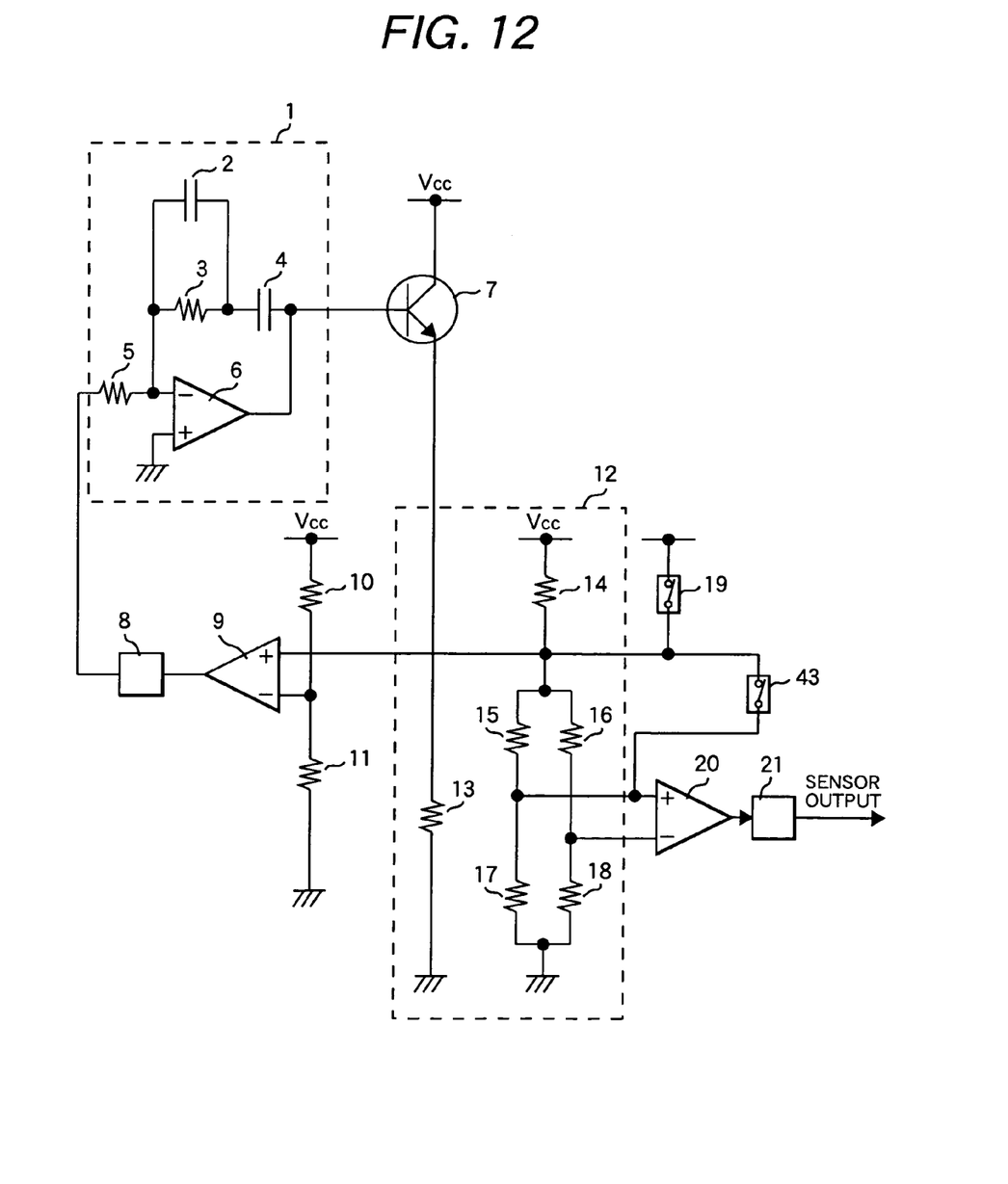
FIG. 12 is a block diagram of a drive circuit included in a thermal type flow measurement apparatus according to a fourth embodiment of the present invention.

Next, a thermal type flow measurement apparatus according to a fourth embodiment of the present invention will be described with reference to FIG. 12. FIG. 12 is a view of a drive circuit included in the thermal type flow measurement apparatus according to the fourth embodiment. The drive circuit of the fourth embodiment, except that it is provided with a switch 43, has the same configuration as the drive circuit included in the thermal type flow measurement apparatus according to the first embodiment. The switch 43 can open and close the connection between a connection point which is between the temperature sensing resistor 14 and the bridge circuit (thermal sensitive resistors 15 to 18) and another connection point which is between the thermal sensitive resistors 15 and 17. Reference numerals which are shown in FIG. 12 and which are the same as those shown in FIG. 1 denote parts equivalent to those shown in FIG. 1.

In the drive circuit of the thermal type flow measurement apparatus according to the fourth embodiment, the switch 43 is turned on in the first operation mode, described for the first embodiment, and turned off in the second operation mode, described for the first embodiment.

In this arrangement, in the first operation mode, the connection point between the temperature sensing resistor 14 and the bridge circuit (thermal sensitive resistors 15 to 18) and another connection point between the thermal sensitive resistors 15 and 17 are shorted by turning off the switch 43. Accordingly, the positive input of the amplifier 9 is applies with a voltage obtained by substantially dividing the supply voltage Vcc with the temperature sensing resistor 14 and the thermal sensitive resistors 16. The resistance of the temperature sensing resistor 14 varies according to the temperature of the air flow to be measured. With such a circuit configuration, the positive input voltage of the amplifier 9 is affected more by resistance variations of the thermal sensitive resistor 17 disposed on the downstream side than by resistance variations of the thermal sensitive resistors 15, 16, and 18. In the second operation mode, the switch 19 is on and the switch 43 is off, so that the circuit configuration is the same as that of the first embodiment.

In the fourth embodiment, relative to the heating resistor 13, the arrangement of the thermal sensitive resistors 16 and 17 on the one side, and the thermal sensitive resistors 15 and 18 on another side may be the same as in any one of the first to the third embodiments. Furthermore, the switch 43 may be turned on when required for adjustment.

Figure 13:
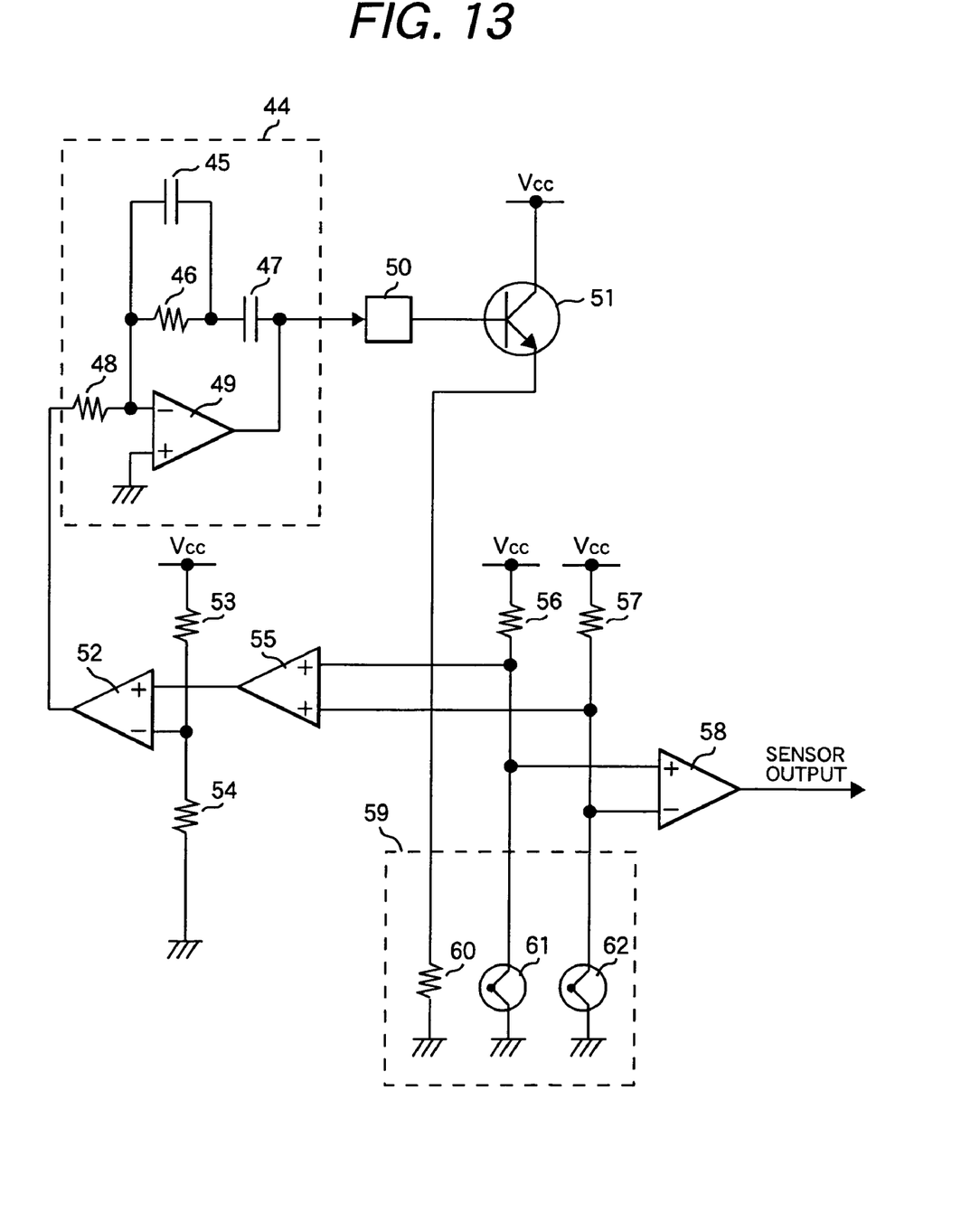
FIG. 13 is a block diagram of a drive circuit included in a thermal type flow measurement apparatus according to a fifth embodiment of the present invention.

Next, a thermal type flow measurement apparatus according to a fifth embodiment of the present invention will be described with reference to FIG. 13. FIG. 13 is a view of a drive circuit included in the thermal type flow measurement apparatus according to the fifth embodiment.

The drive circuit of the fifth embodiment includes the following parts: a heating resistor 60 disposed in a sensor element 59; thermocouples 61 and 62 for sensing temperatures both on the upstream side and on the downstream side of the heating resistor 60; a drive transistor 51 for driving the heating resistor 60; resistors 56 and 57 connected to the thermocouples 61 and 62; and an amplifier 58 for generating a sensor output by amplifying the difference between the output voltages of the thermocouples 61 and 62.

The drive circuit also includes: a weighted average calculator 55 for calculating a weighted average of the output voltages of the thermocouples 61 and 62; an amplifier 52 for amplifying the difference between the output of the weighted average calculator 55 and the voltage at a connection point between resistors 53 and 54; a phase compensation circuit 44 for amplifying the output of the amplifier 52; and a pulse width modulation circuit 50 for subjecting the output of the phase compensation circuit 44 to pulse width modulation and pulse-drives the drive transistor 51.

The phase compensation circuit 44 includes resistors 46 and 48, capacitors 45 and 47, and an amplifier 49.

In the fifth embodiment, the weighted average calculator 55a executes weighted average for temperature outputs sensed by the thermocouples 61 and 62.

The weighted average assigns weights to the output of the thermal sensitive element disposed on the downstream side (for example, the thermocouple 61 in a case where the thermocouple 61 is disposed on the downstream side and the thermocouple 62 is on the upstream side) with respect to a forward flow. In this way, effects similar to those obtained in the first embodiment can be obtained.

In the drive circuit of the fifth embodiment, the heating resistor 60 is pulse-driven. For this, a thermal sensitive element less affected by the temperature of the heating resistor 60 is disposed to face the ground side of the heating resistor 60. This is to reduce electrostatic coupling of pulsing noise generated when the heating resistor 60 is pulse-driven.

In the first to the fifth embodiments, weights (e.g., distance from the heating resistor 13 to the thermal sensitive elements, any of thermal sensitive elements centralized proximity to a central portion of the heating resistor 13, and dimensional reduction of any of the thermal sensitive elements in the direction of the fluid flow) to be assigned to the thermal sensitive element on the downstream side may be set according to the asymmetry of the fluid passage where the thermal air flow measurement apparatus is disposed. Thereby, the volume of a reverse fluid flow can be accurately detected.

What is claimed is:

1. A thermal type flow measurement apparatus comprising:
   a heating element disposed in a fluid passage and which generates heat by a passage of a current through itself;
   a first thermal sensitive element disposed adjacent upstream of the heating element with respect to a forward flow in a direction of fluid flow to be measured;
   a second thermal sensitive element disposed adjacent downstream of the heating element with respect to the forward flow in the direction of fluid flow to be measured, the fluid passage in which the heating element, the first thermal sensitive element, and the second thermal sensitive element are disposed having an asymmetric structure with respect to the direction of fluid flow so that the forward flow is more prone to flow into the fluid passage than that of a reverse flow;
   means for outputting a difference of temperatures sensed by the first and second thermal sensitive elements as a voltage to sense a flow rate of the forward flow and a flow rate of the reverse flow; and
   heat control means which assigns weights to respective temperatures sensed by the first and second thermal sensitive elements and controls the passage of the current through the heating element so that a sum of respective temperatures with the weights reaches a preset value;
   wherein a weight of temperature sensed by the second thermal sensitive element is larger than that of the first thermal sensitive element.

2. The thermal type flow measurement apparatus according to claim 1, wherein the first thermal sensitive element and the second thermal sensitive element differ from each other in sensitivities to a thermal-conductivity from the heating element, and the heat control means comprises a summing operational unit for summing outputs of the first and second thermal sensitive elements, and a current control circuit for controlling passage of a current through the heating element so that an output of the summing operational unit reaches a preset value.

3. The thermal type flow measurement apparatus according to claim 2, wherein a distance between the first thermal sensitive element and the heating element is greater than a distance between the second thermal sensitive element and the heating element, causing the first thermal sensitive element and the second thermal sensitive element to differ from each other in sensitivity.

4. The thermal type flow measurement apparatus according to claim 2, wherein the first thermal sensitive element and the second thermal sensitive element differ from each other in shape, causing the first thermal sensitive element and the second thermal sensitive element to differ from each other in sensitivity.

5. The thermal type flow measurement apparatus according to claim 2, wherein each of the first and the second thermal sensitive elements comprises plural thermal sensitive resistors, and resistances of the first thermal sensitive resistors are higher than resistances of the second thermal sensitive resistors so that the first and second thermal elements differ from each other in sensitivities to a thermal-conductivity from the heating element.

6. The thermal type flow measurement apparatus according to claim 1, wherein the heat control means comprises means for obtaining a weighted average of outputs concerning temperatures sensed by the first and second thermal sensitive elements, and a current control circuit for controlling passage of a current through the heating element so that an output from the means for obtaining the weighted average reaches a preset value.

7. The thermal type flow measurement apparatus according to claim 1, wherein each of the first and the second thermal sensitive elements comprises plural thermal sensitive resistors.

8. The thermal type flow measurement apparatus according to claim 7, further comprising:
   a bridge circuit configured by the thermal sensitive resistors as the first and second thermal sensitive elements;
   an ambient temperature sensing element whose resistance varies according to an ambient temperature, and which is placed in series between the bridge circuit and a voltage source; and
   a select switch selectable between connecting the voltage source to the bridge circuit via the ambient temperature sensing element and connecting the voltage source to the bridge circuit not via the ambient temperature sensing element.

9. The thermal type flow measurement apparatus according to claim 7, the flow measurement apparatus further comprising:
   a select switch for selecting whether or not to short across any one of the first thermal sensitive resistors.

10. The thermal type flow measurement apparatus according to claim 7, wherein the heating element comprises a heating resistor placed between a voltage source and a ground, the first and the second thermal sensitive elements are connected between a voltage source and a ground, the heating element, the first thermal sensitive element, and the second thermal sensitive element are disposed on a same substrate, and an end on the ground side of the heating element and the second thermal sensitive element are disposed closer to each other than to an end on the voltage source side of the heating element.

11. The thermal type flow measurement apparatus according to claim 1, wherein the heat control means has an amplifier in which an amplification becomes greater with a lower frequency except in a predetermined frequency range where the amplifier follows a constant amplification factor.

12. The thermal type flow measurement apparatus according to claim 1, wherein the heating element, the first thermal sensitive element, and the second thermal sensitive element are disposed in an intake pipe which feeds air to an automobile engine.

* * * * *